Nov. 14, 1950 J. W. WOOLF 2,530,278
PLURAL SERIES MOTOR STARTING SYSTEM
Original Filed Aug. 16, 1946
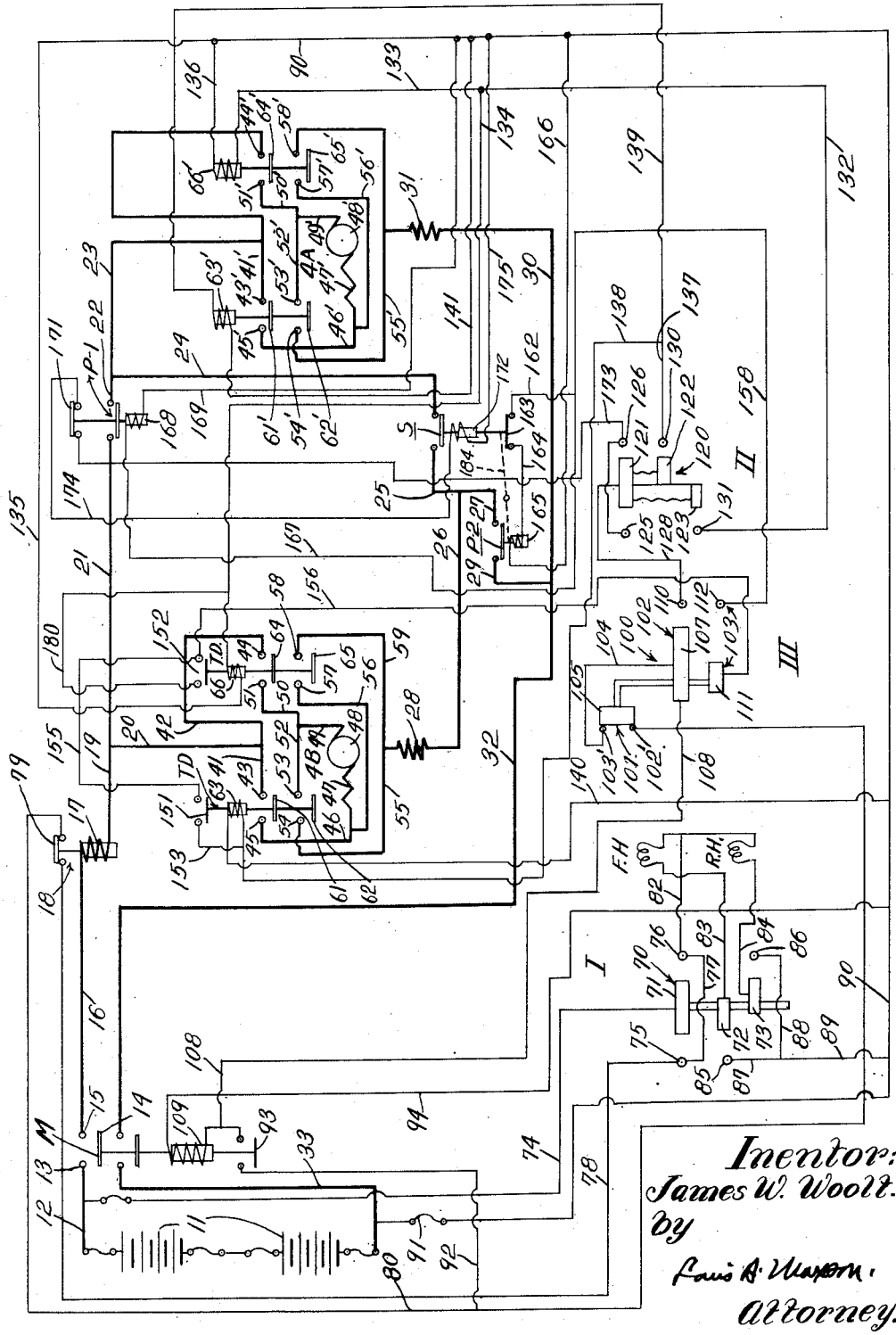
Inventor:
James W. Woolf.
by
Louis A. Wayorn.
Attorney.

Patented Nov. 14, 1950

2,530,278

UNITED STATES PATENT OFFICE 2,530,278

PLURAL SERIES MOTOR STARTING SYSTEM

James W. Woolf, Franklin, Pa., assignor to Joy Manufacturing Company, a corporation of Pennsylvania Original application August 16, 1946, Serial No. 690,856. Divided and this application December 8, 1947, Serial No. 790,425

11 Claims. (Cl. 318—58)

1

This invention relates to plural series motor starting systems, and more particularly to a starting circuit that first places the motors in series and then in parallel.

The invention may be advantageously applied to electrically driven vehicles which are frequently started, stopped and reversed, and which, in the interest of maneuverability, have a dual motor drive.

The principal object of the invention is the provision of an improved control circuit for starting and reversing a dual electric motor system.

Another object is the provision of an improved dual electric motor starting circuit which places the motors first in series and only subsequently in parallel, each time they are started.

A further object is the provision of a dual electric motor starting circuit which places the motors in series and then, after a predetermined time delay, places them in parallel.

Other objects and advantages will appear in the course of the specification and in the appended claims.

In the accompanying drawing, in which one illustrative embodiment of my invention is shown:

The figure is a diagrammatic view of the motors, controls and circuits of the illustrative embodiment.

Referring now to the drawing, it will be observed that two motors, respectively designated 4A and 4B, are shown. These motors may drive any suitable apparatus, and, as above indicated, may desirably be used to drive the traction mechanism of a vehicle. Each of the motors is a series motor, D. C., and, in the illustrative embodiment of the invention, may be battery driven, though it will be obvious that the source of electric current is not limited to a battery. The motors may be driven in series or in parallel, as will later be described. Associated with the motors when these are employed for vehicle propulsion are headlights, identified as F. H. and R. H., and with these headlights there is associated a control mechanism including a so-called "Safe-off" device, this safe-off and front and rear headlight control device being generally designated I. There is also provided a forward and reverse selective switch mechanism, II, and a fast-slow and reset mechanism, III, these several mechanisms being described in detail as the specification proceeds, and being provided with appropriate operating mechanism not illustrated.

The motors 4A and 4B are, as above noted, series motors and each has a commutating winding, an armature, and a series field. Each is reversible by forward and reverse contactors. The direction of motor rotation is controlled by the forward and reverse selective switch mechanism II controlled by any suitable operating mechanism, as for example, a handle (not shown) by means of which it may be turned or moved in either of opposite directions.

The fast-slow and reset mechanism III causes the motors always to be started in series, irrespective of the operator control of the fast-slow and reset mechanism, as later described. This fast-slow and reset mechanism has operating means, not shown, which normally maintains it in an initial or reset position, and which may move it to a part-way forward position in which it establshes series relation between the two motors, and an all-the-way forward position in which the two motors are connected to the source of current in parallel. The operating mechanism for the fast-slow and reset mechanism may, as disclosed in application Ser. No. 690,856, filed August 16, 1946, of which this application is a division, include a control element normally held by a spring in the reset position and movable against the action of the spring successively into the other two positions. The safe-off and front and rear headlight control device I is a safety switch mechanism which requires operation before the other control devices, though operated, can effect any results, and this safe-off and front and rear headlight control device requires one or the other headlight to be on before the vehicle can be set in motion.

As will later be seen, one of the motors is always operated when either is running, and when a series switch S, later more fully described, is closed, motors 4A and 4B will be connected in series across the lines from the current source. One motor will then be very briefly shorted out while the other is connected across the battery, and the series switch will then be opened and a third switch will then be closed, and by it the other motor will be connected across the current source in parallel with the first.

The source of current is illustrated as a battery 11. Its positive end is connected by a conductor 12 with one contact 13 of a main line switch 14. The opposite contact 15 of this switch is connected by a conductor 16 to the coil 17 of an overload relay 18. The other end of coil 17 is connected to a conductor 19. A conductor 20 connects the conductor 19 with the reversing system of motor 4B, while a conductor 21 connects the conductor 19 with one side of a parallel relay or switch P—1, of which the other side is connected to a conductor 22, from which branches 23 and 24 lead respectively to the reversing system of motor 4A and to one side of the series relay or switch S, of which the other side is connected by a conductor 25 to conductors 26 and 27, the first of which is connected with the series field 28 of motor 4B, while the second leads to another or second parallel relay or switch, P—2, whose opposite side is connected by a conductor 29 with a conductor 30 connected with the series field 31 of motor 4A, and with a conductor 32 connected to one side of the other half of the main line switch, and the opposite side of this half of the main line switch is connected by a suitably fused connection 33 with the negative end of the battery.

The reversing system proper of the motors 4A and 4B are the same, and so the system associated with motor 4B needs only to be described. Conductor 20 is connected by conductors 41 and 42 to switch contacts 43 and 44 respectively. A contact 45, connectible by a switch element with the contact 43, is connected by conductor 46 with the commutating winding 47 of motor 4B, and through such winding to the armature 48, through an appropriate brush arrangement. The other brush arrangement is connected by a conductor 49 to conductor 50 leading to a contact 51 opposite contact 44, and by a conductor 52 leading to a contact 53, whose associated contact 54 is connected by a conductor 55 with the series field 28. From the conductor 46 there branches a conductor 56 leading to a contact 57, whose associated contact 58 is connected by a conductor 59 also to the series field 28. Contact members 61 and 62, moved concurrently by a relay means or solenoid 63, are adapted to connect contact 43 with contact 45 and contact 53 with contact 54, when the solenoid is energized, as later explained. Contact members 64 and 65, moved concurrently by a second relay means or solenoid 66, are adapted to connect, when moved to closed positions, the contact 44 with the contact 51 and the contact 58 with the contact 57. There is an interlock, later more fully described, associated with each of the switch devices just described, but not with the corresponding switches associated with motor 4A. These interlocks, which are of the normally open, time delay closing type, are shown for simplicity as actuated by the same armatures that actuate the contact members 61 and 62, and the contact members 64 and 65, but in fact are actuated by the flux of the solenoids, but through delayed action elements of a well known commercial design. The facts that they are not directly actuated by the same armatures and that their actuation is accomplished only after a slight time delay, are indicated by the letters TD.

When the main line switch and the contact members 61 and 62 are closed, the motor 4B is driven in one direction by current passing from the conductor 20 through conductor 41, switch 43, 61, 45, conductor 46, commutating winding 47, motor armature 48, conductors 49 and 52, switch 53, 62, 54, conductor 55, series field 28, and the conductor 26, etc. When the contact members 64 and 65 are closed, the motor is driven in the opposite direction by current passing from conductor 20 to conductor 26, as follows: via conductor 42, switch 44, 64, 51, conductors 50 and 49, motor armature 48, commutating windings 47, conductor 56, switch 57, 65, 58, conductor 59 and the series field 28.

The safe-off, front light or rear light device I or 70 may now be considered. This device is controlled by any suitable handle, not shown, and is diagrammatically illustrated as comprising three contact elements 71, 72 and 73, all movable together, and movable in one direction or the other from a central "off" position. A suitably fused line 74 leads from the positive line 12 to, and is suitably permanently connected to, the contact element 71. Contacts 75 and 76 are selectively engageable by contact element 71 as it is moved in opposite directions from its central position. These are connected together as at 77. Both are connected through a conductor 78 with a relay switch 79 controlled by the overload coil 17, and thence by a conductor 80 to the fast-slow-reset device 100 later described. Contact 76 is connected by a branching conductor 82 to the front headlight FH and to the rear headlight RH, and the other sides of the front and rear headlights are respectively connected to the contacts 72 and 73 by conductors 83 and 84. Stationary contacts 85 and 86, respectively engageable by the movable contacts 72 and 73 are connected by conductors 87 and 88, and a common conductor 89, with a line 90, which is connected to the negative side of the battery 11 by way of a fuse 91 and a portion of the conductor 33. From the foregoing description, it will be clear that either headlight may be turned on, dependent on the direction of movement of the device 70, and it will further be noted that there is a branch 92 off the line 80 which connects with one side of an interlock switch mechanism 93 associated with the main line switch M and which is closed when the main line switch closes, and which when closed establishes a holding circuit for the main line switch through a conductor 94 leading to the negative conductor 90. Moreover, when interlock switch 93 is closed, current is supplied to the fast-slow-reset mechanism as later noted, but attention may now be called, in passing, to the conductor 108.

The fast-slow-reset mechanism is generally designated 100 or III, as noted above, and it may well be operated by a foot lever not shown where this control is employed on a mine vehicle. This mechanism includes a reset arrangement, an arrangement for effecting connection of the motors in series, and an arrangement for effecting their connection in parallel. These are diagrammatically illustrated at 101, 102 and 103. While any suitable arrangement may be used in practice, the device 101 is shown as comprising a contact 102' to which the positive line 80 leads, a contact 103' connected to a contact element 107 by a conductor 104, and a movable contact 105 which connects the contacts 102' and 103' when the three devices 101, 102 and 103 are in "Reset" position. The contact 107 of the device 100 is connected by a conductor 108 to the lower end of the main line switch solenoid 109, at a point nearer the latter than the interlock 93. Contact 107 is adapted to engage a stationary contact 110, and when so engaged to effect closure of the switch S and connection of the motors 4B and 4A in series to the battery 11. Movable contact 111 of device 103 is adapted to cooperate with a stationary contact 112 when the operating element is in full forward position and thereby to effect, as later described, connection of the motors in parallel to the battery. The contacts 105, 107 and 111 are movable together, but not, aside from the connection 104, electrically connected with each other.

Before describing further the functions of the device 100, forward and reverse selective switch mechanism 120 (or II) may well be described. This includes three contact elements 121, 122 and 123, all electrically connected, and all movable together, and having a neutral position as shown, and selectively oppositely movable by an operating handle, not shown, to effect selective forward or reverse drive. Contact 121 connects with one or the other of connected contacts 125 and 126 in the different turned positions of the device 120. It is connected by a conductor 128 with contact 110. When device 120 is moved in one direction, contact 122 contacts a stationary contact 130, and when device 120 is turned in the opposite direction, the contact 123 contacts a stationary contact 131.

Contact 131 is connected by a conductor 132 having branches 133 and 134 to the solenoids 66' and 66, and these solenoids are connected by conductors 136 and 135 to the line 90. Hence, when contact 123 is in engagement with contact 131 and current is delivered to contact 110, the motors will turn in one direction. Contact 130 is connected by a conductor 137 and branch conductors 138 and 139 to the solenoids 63 and 63' and the other ends of these solenoids are connected respectively by conductors 140 and 141 to the line 90. Thus when contact 122 and contact 130 are in contact and current is being delivered to contact 110, the motors will both turn in the other direction.

It has been noted that time delay action devices, which may now be noted to be numbered 151, 152, are associated with the reverse switch mechanisms of motor 4B, and that in whichever direction this motor is connected to run one of these devices 151 or 152 will be closed. Their closure provides, when current is being supplied to contact 110, for current to be supplied to contact 111 a second or so after the running connections for the motors are established. This, for example, because current from 110 (when contacted by 107) will flow via conductor 128, contact 121, say contact 122, contact 130, conductors 137 and 138, the conductor 153, switch device 151, conductor 155 and conductor 156 to contact element 111, and thence may flow to line 158 when contact 111 engages contact 112. Line 158 connects by a branch 162 to a normally closed switch 163 movable with and opened by switch S when the latter is closed, the other side of switch 163 being connected by a conductor 164 to the operating coil 165 of the switch P—2; and the opposite end of this coil is connected by a conductor 166 to the line 90. Another branch 167 of line 158 goes to the operating coil 168 of the switch P—1, and the other side of this coil 168 is connected by a conductor 169 back to the line 90. Switch P—1 has a switch 171 movable with it, normally closed, but opened when switch P—1 is closed, and controlling current flow to the operating coil of the switch S. When contact 121 engages either 125 or 126 and current is being conducted to contact 121 current will flow by way of conductor 173 and switch 171, through the same when closed, through a conductor 174 to the operating coil or solenoid 172 to close switch S, and then to conductor 90 by way of a conductor 175. When switch P—1 closes switch S will be noted to open. It may be observed that when the time delay device 152 is closed, contact 131 will be connected by conductors 132 and 134, a conductor 180, the time delay switch 152, and conductor 156 to contact 111.

The further mode of operation may now be noted. When the device 100 is turned or moved to the right in the drawing, contacts 102 and 103 will be moved with contact 105, and if the solenoid 109 is, for any reason, deenergized, as by an overload taking place, resetting by return of contact 100 to the position shown will be necessary for reclosure of the main line switch.

Now, assuming that the device 120 has been set to predetermine the direction of motor operation, movement to the right of switch element 107 into contact with contact 110 will bring about closure of the selected direction-controlling switches and closure of the switch S, and the motors will be connected in series across the battery in a manner which will be obvious from what has been said, the current passing through motor 4B, through conductors 26, 25, switch S, conductors 24, 23, and motor 4A in series. When device 100 is turned further to the right and switch element 111 establishes contact with contact 112, the line 158 will be energized, and the solenoid 168 of switch P—1 will be energized, and that switch will be closed, shorting out motor 4B very briefly, and then, because closure of switch P—1 opens the circuit through the solenoid 172 of switch S, the latter will open, terminating the short circuiting of motor 4B; and, as switch S opens, it will, through the movement of switch 163, close the circuit through which the solenoid 165 of switch P—2 will be energized, and motor 4B will be placed in parallel with motor 4A across the battery, motor 4A having been connected across the battery when switch P—1 closed.

The mode of operation of the control mechanism will be clear from what has been said, and it appears unnecessary to repeat the details of circuits established during the operations mentioned. It may be observed, however, that because the current to conductor 158 is controlled by one or the other of switches 151, 152, the motor direction control effecting actions must be completed before the devices operated by the current from conductor 158 can be energized.

Desirably, a mechanical interlock may be provided between switches P—2 and S absolutely to insure against both being closed at the same time, with P—1 also closed through sticking of the parts or any mechanical difficulty. Such an interlock may be provided in the form of a pivoted lever connected with the movable switch parts of switches S and P—2 so that each may be closed separately, but not both together. Such an interlock is shown diagrammatically at 184. It will be understood by those skilled in the art that the contact 163 of switch S will be provided with a lost-motion device to permit closing of switch P—2 without interference because of the fact that contact 163 is already in its extreme lower position. Such interlocks and lost-motion devices are well known in the art and need not be detailed here.

The various controls, especially the mechanisms 70, 100, 120, and switch devices 151 and 152, are shown very much in diagrammatic form, for simplicity of illustration, and it will of course be understood that arrangements for making movable parts stationary and vice versa are all within the scope of my invention to the extent covered by the appended claims.

From what has been said, it will be appreciated that this invention provides a very useful and desirably functioning motor control system having adaptability to other uses, but operative very effectively in the propulsion of mine vehicles. The controls are very simple, effective, guard against harmful results of oversight, and though the operator might inadvertently or even deliberately attempt to start the motors in parallel through immediate movement of the fast-slow-reset device to the limit of its extreme operating position, yet the motors would still be started in series though they would relatively quickly pass through the series connection stage and be in parallel across the battery.

While there is in this application specifically described one form which my invention may assume in practice, it will be understood that this form of the invention is shown for purposes of illustration and that the invention may be modified and embodied in various other forms without departing from its spirit or the scope of the appended claims.

What I claim as new and desire to secure by Letters Patent is:

1. In a dual motor circuit comprising relay means having contacts in separate circuits connected to each motor, a series relay having a contact to connect said motors in series when energized, a parallel relay for connecting one side of said motors together, a connection to energize the series relay through a normally closed contact of said parallel relay, a normally open time delay closing contact energized with the operation of said relay means to close a circuit and energize said parallel relay which opens the circuit of said series relay, a normally closed contact actuated by said series relay to connect a circuit to a second parallel relay which connects together the other side of said motors to complete the circuit placing them in parallel.

2. In a dual motor circuit comprising relay means having contacts in separate circuits connected to each motor, a series relay having a contact to connect said motors in series when energized, a parallel relay for connecting one side of said motors together, a connection to energize the series relay through a normally closed contact of said parallel relay, a normally open time delay closing contact energized with the operation of said relay means to close a circuit and energize said parallel relay which opens the circuit of said series relay, a second parallel relay having a mechanical interlock with said series relay and energized by said normally open time delay closing contact for connecting the other side of said motors together.

3. In the motor circuit of claim 1, switch means for energizing said relay means and said series relay to operate said motors in series.

4. In the motor circuit of claim 2, switch means for energizing said relay means and said series relay to operate said motors in series.

5. In a motor circuit according to claim 1, switch means for energizing said relay means and said series relay to operate said motors in series at least as long as the period required to operate said time delay contact.

6. In a motor circuit according to claim 1, a two position switch means connected in its first position to energize said relay means and said series relay to operate the motors in series and connected in its second position to maintain energization of said relay means and to close the control circuit to both of said parallel relays, said motors operating in series at least as long as the period required to operate the time delay contact.

7. A motor circuit according to claim 1, characterized in that the contacts of said relay means are in each of two opposite legs of respective four-legged bridge reversing motor circuits.

8. In a dual motor running and reversing circuit, the combination of two motors each having forward and reverse relay means and each relay means provided with a contact in each of two opposite legs of a respective four-legged bridge reversing circuit for each of said motors, a series relay having a contact to connect said motors in series when energized, a parallel relay for connecting one side of said motors together, a connection to energize the series relay through a normally closed contact of said parallel relay, a normally open time delay closing contact energized with the operation of said relay means to close a circuit and energize said parallel relay which opens the circuit of said series relay, a normally closed contact actuated by said series relay to connect a circuit to a second parallel relay which connects together the other side of said motors to complete the circuit placing them in parallel.

9. In a motor circuit according to claim 8, two-position switch means connected when actuated to the first position to selectively operate said motors in series for forward or reverse operation and when actuated to the second position to selectively operate the motors in parallel for forward or reverse operation, the parallel operation of said motors requiring a series connection of said motors for at least the duration of the operation of said time delay closing contact.

10. In a motor circuit according to claim 8, means to selectively energize the forward or reverse relay means to operate the motors in series or parallel, the parallel operation of said motors requiring a series connection of said motors for at least the duration of the operation of the time delay closing contact.

11. In a dual motor running and reversing circuit, the combination of two motors each having forward and reverse relay means and each relay means provided with a contact in each of two opposite legs of a respective four-legged bridge reversing circuit for each of said motors, a series relay having a contact to connect said motors in series when energized, a parallel relay for connecting one side of said motors together, a connection to energize the series relay through a normally closed contact of said parallel relay, a normally open time delay closing contact energized with the operation of said relay means to close a circuit and energize said parallel relay which opens the circuit of said series relay, a second parallel relay having a mechanical interlock with said series relay and energized by said normally open time delay closing contact for connecting the other side of said motors together.

JAMES W. WOOLF.

REFERENCES CITED

The following references are of record in the file of this patent:

UNITED STATES PATENTS

| Number | Name | Date |
|---|---|---|
| 801,214 | Case | Oct. 10, 1905 |
| 932,114 | Folsom | Aug. 24, 1909 |
| 1,037,433 | Carichoff | Sept. 3, 1912 |
| 2,348,053 | Bowker | May 2, 1944 |
| 2,371,555 | Stamm | Mar. 13, 1945 |